Figure 1:
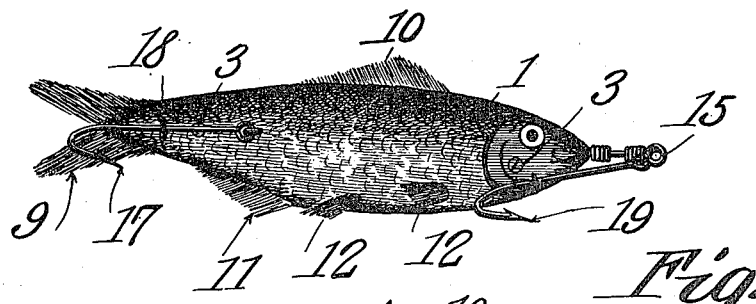

J. BOHANNAN.
ARTIFICIAL BAIT.
APPLICATION FILED NOV. 3, 1909.

963,202.

Patented July 5, 1910.

Witnesses

Inventor
Joe Bohannan
By
Attorneys

UNITED STATES PATENT OFFICE.

JOE BOHANNAN, OF FARMINGTON, ILLINOIS.

ARTIFICIAL BAIT.

963,202.  Specification of Letters Patent.  Patented July 5, 1910.

Application filed November 3, 1909. Serial No. 526,084.

*To all whom it may concern:*

Be it known that I, JOE BOHANNAN, a citizen of the United States, residing at Farmington, in the county of Fulton and State of Illinois, have invented a new and useful Artificial Bait, of which the following is a specification.

It is the object of this invention, generally, to provide a bait of novel and attractive form, means being provided for securing the fins and the tail of the same in place.

Another object of the invention is to provide a novel means whereby the hooks may be assembled with the body, and to provide a means for detachably securing the free ends of the hooks to the body.

Another object of the invention is to provide a device of the class described, which, as it moves through the water, will at all times maintain a natural position, which natural position is secured by properly weighting the lower portion of the body and by providing the upper portion of the body with an air-chamber whereby the device may be held in proper position, the air-chamber coöperating with the weight to secure the desired end.

With these and other objects in view, the invention consists in the novel construction and arrangement of parts hereinafter described, delineated in the drawings, and specifically claimed, it being understood, that, since the drawings show but one form of the invention, changes, properly falling within the scope of what is claimed, may be made, without departing from the spirit of the invention.

Similar numerals of reference are employed to denote corresponding parts throughout the several figures of the drawings, wherein:—

Figure 2:
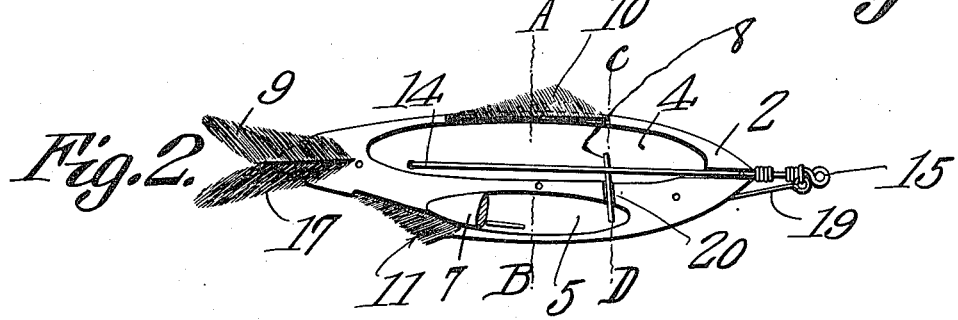
Figure 3:
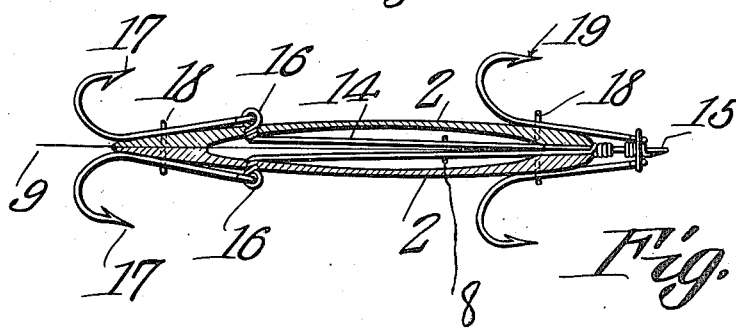
Figures 4, 5:
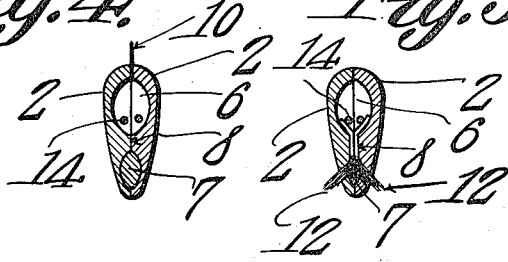
Figure 6:
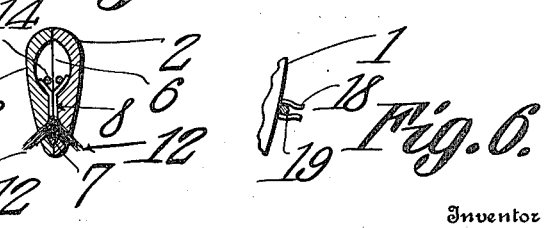

Figure 1 is a side elevation; Fig. 2 is a side elevation of the sections which unite to form the body of the bait, the inner face of the section being shown; Fig. 3 is a longitudinal section; Fig. 4 is a transverse section on the line A—B of Fig. 2; Fig. 5 is a transverse section on the line C—D of Fig. 2; and Fig. 6 is a fragmental end elevation.

The invention includes as a fundamental element, a body in the shape of a fish, it of course being understood that the body may be colored in any desired manner, to simulate a fish of any given species. This body 1 is divided longitudinally in what, as the device moves through the water, will be the vertical plane. This division of the body forms laterally separable sections 2, adapted to be clamped together, by screws 3 or other retaining members, located in any desired positions in the body 1.

The abutting faces of the sections 2 are provided with longitudinaly disposed channels 4 and 5, the channels 4 uniting, when the sections are clamped together, to form an air-chamber 6 in the upper portion of the body, and the chanels 5 uniting to form a chamber in the lower portion of the body, the last named chamber being arranged to receive a weight 7, the portions of the sections 2 located between the channels 4 and 5 constituting longitudinally disposed ribs 8 upon the abutting faces of the sections 2.

The invention further includes a tail 9, a dorsal fin 10, a caudal fin 11, and a plurality of ventral fins 12, all of said fins, in their preferred form, being fashioned from feathers. The parts 9, 10 and 11 are inserted between the sections 2, and, when the screws 3 are mounted in place, the aforesaid fins will be clamped securely between the sections which go to make up the body.

The method of mounting the ventral fins 12 differs slightly from the method of mounting the fins 10 and 11. In mounting the ventral fins 12, openings are provided in the side walls of the body 1, through which openings, the ventral fins 12 are passed, the fins extending, in the first instance, into the chamber in which the weight 7 is mounted, and subsequently extending, as shown most clearly in Fig. 5 of the drawings, across the ribs 8, the ribs, if desired, being slightly recessed, as denoted by the numeral 20, in order that the ventral fins 12 may not serve to space apart the component sections 2 of the body. The upper ends of the ventral fins 12 extend slightly into the air-chamber 6.

Mounted in the nose of the body and arranged to protrude therefrom, is a leader 15, comprising resilient arms 14, extending rearwardly through the air-chamber 6, in close proximity to the ribs 8. These resilient arms are, as shown most clearly in Figs. 2 and 5 of the drawings, adapted to be compressed, when the sections 2 are brought together, to engage the inner extremities of the ventral fins 12, to bend the same over the ribs 8, the weight 7 which is mounted in the lower portion of the body engaging the ventral fins 12 adjacent the points where they pass through the body.

The rear extremities of the arms 14 are carried laterally through the body, as shown at 16, and terminate in eyes, adapted to receive hooks 17, pivotally, the said hooks extending rearwardly toward the tail 9. Other hooks 19, are assembled in any desired manner with the nose of the body. In the present instance, I have secured these hooks 19 to the protruding portion of the leader 15, but it is obvious that, if desired, another means for mounting the hooks may be provided, without departing from the spirit of the invention, the main object in view being, that the hooks 19 shall be pivotally assembled in a secure manner, to the body 1 adjacent the nose thereof.

The body 1 is provided with a plurality of resilient bipartite clips 18, shown most clearly in Fig. 6 of the drawings, and there specifically applied to the forward hooks 19, although it is to be understood, as clearly shown in the drawings, that a similar set of these resilient clips 18 are mounted upon the body of the fish adjacent the tail thereof, to serve as a means for sustaining the free ends of the hooks 17.

Owing to the fact that the weight 7 is mounted in the lower portion of the body, and that the upper portion of the body is provided with the air-chamber 6, the bait, as it moves through the water, will maintain at all times, a life-like position. This weight 7, moreover, serves as a means for retaining the fins 12 in place, the fins 12 being further retained by being bent over the ribs 8 and clamped in position by the resilient arms 14 of the leader 15.

Owing to the fact that the several hooks are assembled directly with the leader 15, the hooks are not likely to be pulled out of the body when the fish strikes the hooks. The hooks may readily be assembled with the forward end of the leader, in the one instance, and with the rear end of the leader in the other instance, and in either case, after being so assembled, may be detachably secured, longitudinally of the body, by means of the resilient clips 18.

A bait constructed in accordance with my invention, will, not only, present an attractive appearance, but, as well, move in a natural manner through the water, and resist the hard usage to which devices of this class are commonly subjected. Owing to the facility in which the sections may be separated, a new fin or a new tail may be readily added to the device at any time, and, as hereinbefore pointed out, the hooks may readily be renewed at will.

Having thus described the invention what is claimed, is:—

1. A device of the class described comprising a body in the shape of a fish and composed of laterally separable sections, having longitudinal, coöperating ribs upon their abutting faces; fins arranged to be inserted in the body to extend over the ribs; and a leader protruding from the nose of the body and comprising resilient arms arranged to bend the fins over the ribs.

2. A device of the class described comprising a body in the shape of a fish and composed of laterally separable sections, having longitudinal coöperating ribs upon their abutting faces; fins arranged to be inserted in the body to extend over the ribs; and a leader protruding from the nose of the body and comprising resilient arms arranged to be engaged by the sections, and to engage the fins to bend the same over the ribs; and means for drawing the sections together to engage the arms.

3. A device of the class described comprising a body in the shape of a fish; a leader protruding from the nose of the body and comprising diverging arms laterally extended through the body; hooks mounted upon the extended portions of the arms; and resilient clips mounted upon the body and arranged to engage the hooks.

4. A device of the class described comprising a body in the shape of a fish; a hook pivotally secured to the body; and a resilient bipartite clip carried by the body and arranged to receive between its constituent parts the free end of the hook.

5. A device of the class described comprising a body in the shape of a fish and composed of laterally separable sections having upon their abutting faces longitudinally disposed channels arranged to unite to form a chamber in the upper portion of the body and a chamber in the lower portion thereof; and a weight retained against movement in the last named chamber.

6. A device of the class described comprising a body in the shape of a fish and composed of laterally separable sections provided upon their abutting faces with longitudinal channels arranged to unite to form a chamber in the upper portion of the body, a chamber in the lower portion of the body, and a rib separating the chambers; fins arranged to be inserted in the body to extend over the rib; and a weight mounted in the lower chamber and arranged to engage the fins.

7. A device of the class described comprising a body in the shape of fish and composed of laterally separable sections having in their abutting faces, longitudinally disposed channels arranged to coöperate to form a chamber in the upper portion of the body, a chamber in the lower portion of the body, and a rib between the chambers; fins arranged to be inserted in the body to extend over the rib; a leader protruding from the nose of the body and comprising resilient arms arranged to bend the fins over the rib; and a weight mounted in the lower chamber and arranged to engage the fins.

8. A device of the class described comprising a body in the shape of a fish and composed of laterally separable sections provided upon their abutting faces with longitudinal channels aranged to unite to form a chamber in the upper portion of the body, a chamber in the lower portion of the body, and a rib separating the chambers; fins arranged to be inserted in the body to extend over the rib; a weight mounted in the lower chamber and arranged to engage the fins; hooks assembled with the arms and located upon the exterior of the body; and means carried by the body for detachably securing the free ends of the hooks.

In testimony that I claim the foregoing as my own, I have hereto affixed my signature in the presence of two witnesses.

JOE BOHANNAN.

Witnesses:
 CLYDE STEENBURG,
 JOHN WELKER.